US012773736B2

(12) United States Patent
Velesig et al.

(10) Patent No.: US 12,773,736 B2
(45) Date of Patent: Oct. 27, 2026

(54) VARIABLE FUNCTIONAL EDGE PREPARATION

(71) Applicant: Kennametal Inc., Latrobe, PA (US)

(72) Inventors: Joseph Velesig, West Lebanon, PA (US); Qiang Wu, Irwin, PA (US); Joshua Singley, Latrobe, PA (US); Norm DiMatteo, Blairsville, PA (US)

(73) Assignee: KENNAMETAL INC., Latrobe, PA (US)

( * ) Notice: Subject to any disclaimer, the term of this patent is extended or adjusted under 35 U.S.C. 154(b) by 391 days.

(21) Appl. No.: 18/517,665

(22) Filed: Nov. 22, 2023

(65) Prior Publication Data

US 2025/0162041 A1 May 22, 2025

(51) Int. Cl.
*B23B 27/16* (2006.01)

(52) U.S. Cl.
CPC ..... *B23B 27/1611* (2013.01); *B23B 2200/245* (2013.01)

(58) Field of Classification Search
None
See application file for complete search history.

(56) References Cited

U.S. PATENT DOCUMENTS 7,438,508 B2 * 10/2008 Alm ...................... B23B 27/145 407/115
2008/0170919 A1 7/2008 Dufour et al.
2009/0226269 A1 9/2009 Iyori et al.
2009/0238649 A1 9/2009 Kruszynski et al.
2011/0070040 A1 3/2011 Park et al.
2012/0294682 A1 11/2012 Park
2013/0223942 A1 8/2013 Matsuo et al.
2013/0336732 A1 12/2013 Jansson
2015/0023744 A1 1/2015 Wu et al.
2015/0075338 A1 3/2015 Onodera
2017/0368613 A1 12/2017 Straka et al.
2019/0283148 A1 9/2019 Koike et al.
2020/0406368 A1 12/2020 Matsuda et al.
2024/0100610 A1 * 3/2024 Nagafuchi ............ B23C 5/1045

FOREIGN PATENT DOCUMENTS

CN 1799736 A 7/2006
EP 4670875 A1 * 12/2025 ........... B23B 27/145
JP H08505813 A * 6/1996 ............. B23C 5/202
JP 2006239830 A 9/2006
JP 2010099778 A 5/2010

* cited by examiner

*Primary Examiner* — Jacob J Cigna
(74) *Attorney, Agent, or Firm* — Christopher J. Owens

(57) ABSTRACT

A cutting insert comprising a variable function cutting edge wherein said cutting edge has a variable cutting edge height along a length of said cutting edge. This invention further provides a cutting insert comprising a cutting edge having a nose and a depth of cut location, and wherein the cutting edge has a generalized first height, and wherein the cutting edge of the depth of cut location has a second height, and wherein the cutting edge of the nose has a third height, and wherein the second height of the cutting edge of the depth of cut location is smaller than the third height of the cutting edge of the nose of the cutting insert.

12 Claims, 10 Drawing Sheets

VARIABLE FUNCTIONAL EDGE PREPARATION

CROSS-REFERENCE TO RELATED APPLICATION

Not applicable.

STATEMENT REGARDING FEDERALLY SPONSORED RESEARCH OR DEVELOPMENT

Not Applicable.

BACKGROUND OF THE INVENTION

1. Field of the Invention

The present invention provides a cutting insert comprising a cutting edge wherein the cutting edge has a variable cutting edge height (or size) and strength along said cutting edge.

The present invention relates to a cutting insert comprising a cutting edge having a nose, and a depth of cut location, and wherein said depth of cut location is positioned opposite to said nose, and wherein said cutting edge has a first height, and wherein said depth of cut location of the cutting edge has a second height, and wherein the nose of the cutting edge that has a third height, and wherein the second height of the cutting edge of the depth of cut location is smaller than the third height of the cutting edge of the nose of the cutting insert. The present invention provides a cutting insert that has a higher K-factor at the cutting edge of the depth of cut location compared to the K-factor at the cutting edge of the nose of the cutting insert.

2. Description of the Background Art

The background art discloses cutting inserts having cutting edges having a constant edge height. The background art further describes cutting inserts having cutting edges and chip dividing portions, and cutting inserts having top surfaces having octagonal shapes and edge portions that have wedge angles that change from a first angle at a first end of an edge portion to a different angle at a second end of the edge portion. The background art shows parallelogram-shaped cutting inserts having a main cutting edge that has a variable radial rake angle. The background art describes an indexable cutting insert for solid drills having four identical cutting edges wherein the height of the four cutting edges varies over the length of the respective cutting edges.

The background art does not address the need to have a cutting insert having a cutting edge in the area of the depth of cut location that has an increased K-factor to improve tool life while allowing for a standard edge preparation on the nose of the cutting insert. This invention addresses the above disadvantages of the background art.

SUMMARY OF THE INVENTION

A variable function edge preparation of a cutting insert is provided in this invention. In certain embodiments, a cutting insert comprising a cutting edge having a nose and a depth of cut location, wherein the cutting edge has a first end and a second end that is located opposite to the first end, and wherein the nose is located at the second end of the cutting edge, and wherein the depth of cut location is positioned opposite to the nose and extends in part away from the nose in the direction toward the first end of the cutting insert, and wherein the cutting edge has a first height, and wherein the depth of cut location has a cutting edge that has a second height, and wherein the nose has a cutting edge that has a third height, and wherein the second height of the cutting edge of the depth of cut location is smaller than the third height of the cutting edge of the nose of the cutting insert.

In certain embodiments of this invention, a cutting insert is provided having a base and at least one cutting edge positioned in juxtaposition to the base. The cutting edge has a first end and a second end that is located opposite to the first end and wherein the cutting edge has a length extending from the first end of the cutting edge to the second end of the cutting edge and wherein the cutting edge has a height measured from a plane of the base of the cutting insert and wherein the height of the cutting edge varies over the length of the cutting edge. The cutting edge has a nose located at the second end of the cutting insert and a depth of cut location located opposite to said nose and extending in part from the nose in the direction toward the first end of the cutting insert. The height of the cutting edge of the cutting insert at the depth of cut location is smaller than the height of the cutting edge located at the nose of the cutting insert. The present invention provides a cutting insert that has a higher K-factor at the cutting edge of the depth of cut location compared to the K-factor at the cutting edge of the nose of the cutting insert.

These and other embodiments of this invention shall be described in more detail herein and in the drawings that show certain embodiments of this invention.

BRIEF DESCRIPTION OF THE DRAWINGS

While various embodiments of this invention are illustrated in the drawings, the particular embodiments shown should not be construed to limit the claims. Various modifications and changes may be made without departing from the scope of the invention.

DETAILED DESCRIPTION OF THE INVENTION

Referring to FIGS. 1, 2, 3, 4, and 5, a variable function cutting edge preparation (5) of a cutting insert (1) is provided of this invention. The cutting insert (1) comprising a cutting edge preparation (5) wherein the cutting edge has a variable cutting edge height (or size) and strength along said cutting edge preparation (5).

Figure 1:
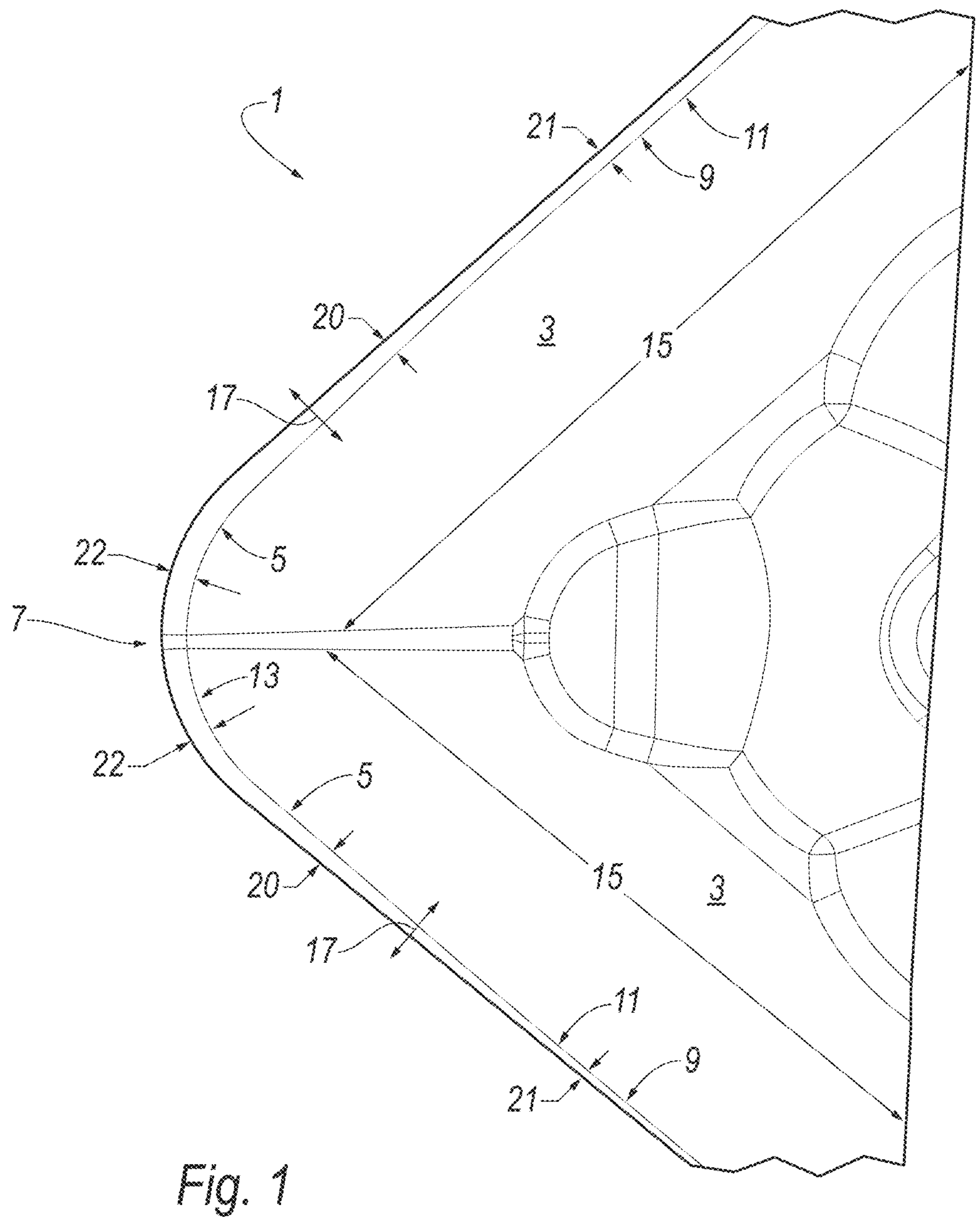
FIG. 1 shows a top view of the cutting insert of this invention having a variable functional cutting edge.
Figure 2:
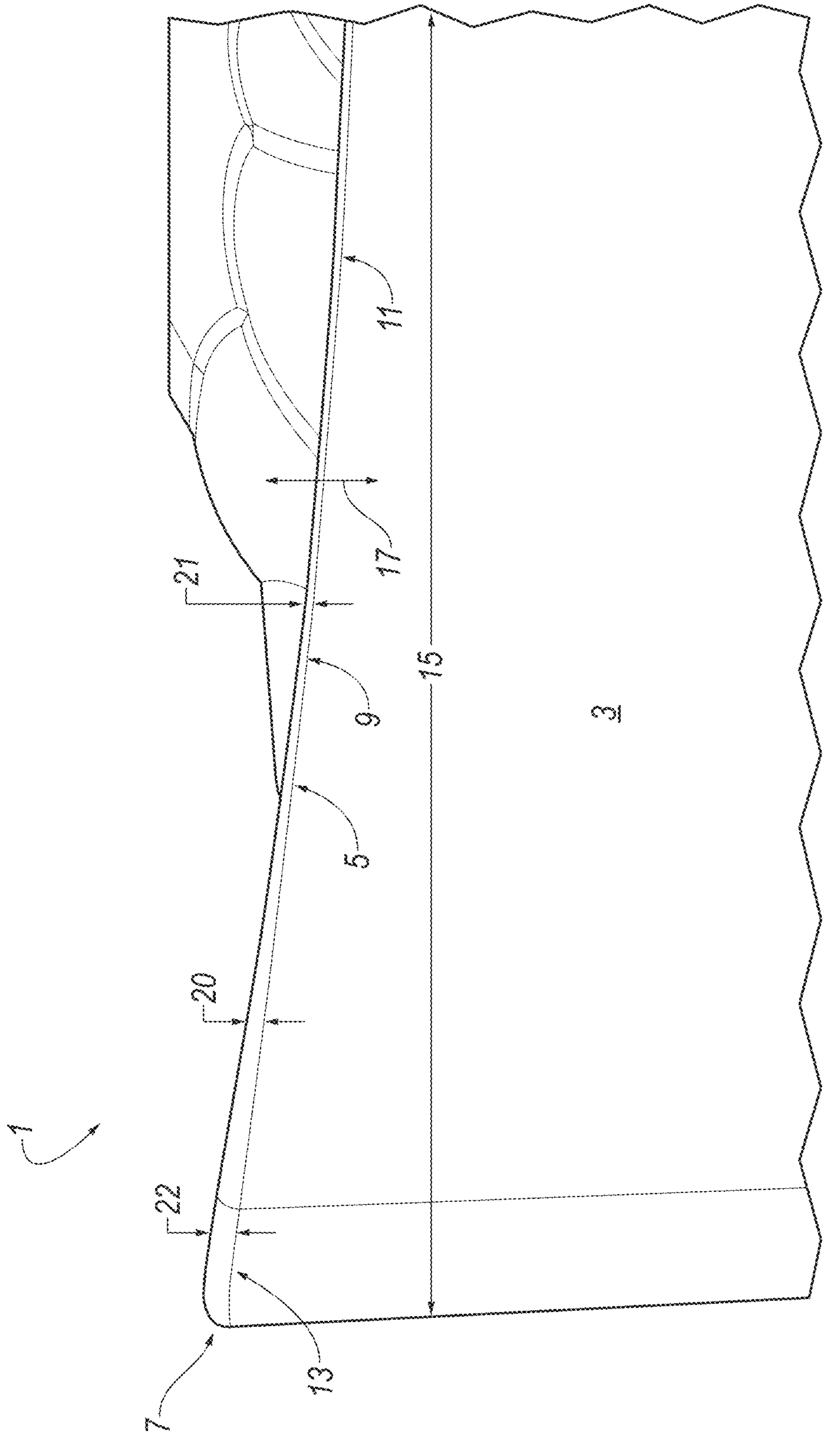
FIG. 2 shows a side view of the cutting insert of this invention having a variable functional cutting edge.

Referring to FIG. 1 and FIG. 2, a variable function cutting edge preparation (5) of a cutting insert (1) is provided in this invention. In certain embodiments of this invention, a cutting insert (1) is provided having a cutting edge (5) having a nose (7) and a depth of cut location (9), wherein the cutting edge (5) has a first end (11) and a second end (13) that is located opposite to the first end (11), and wherein the nose (7) is located at the second end (13) of the cutting edge (5), and wherein the depth of cut location (9) is positioned opposite to the nose (7) and extending in part away from the nose (7) in the direction toward the first end (11) of the cutting insert (1), and wherein the cutting edge (5) has a first height (20), and wherein the cutting edge (5) of the cutting insert (1) at the depth of cut location (9) has a second height (22), and wherein the cutting edge (5) of the cutting insert (1) at the nose has a third height (22), and wherein the second height (21) of the cutting edge (5) of the depth of cut location (9) is smaller than the third height (22) of the cutting edge (5) located at the nose (7) of the cutting insert (1). In other words, there is a drop (i.e. change) in the size of the first height (20) of the cutting edge (5) in the direction toward the size of the second height (21) of the cutting edge (5), and there is a drop in size of the third height (22) of the cutting edge (5) in the direction toward the size of the second height (21) of the cutting edge (5).

Figure 6:
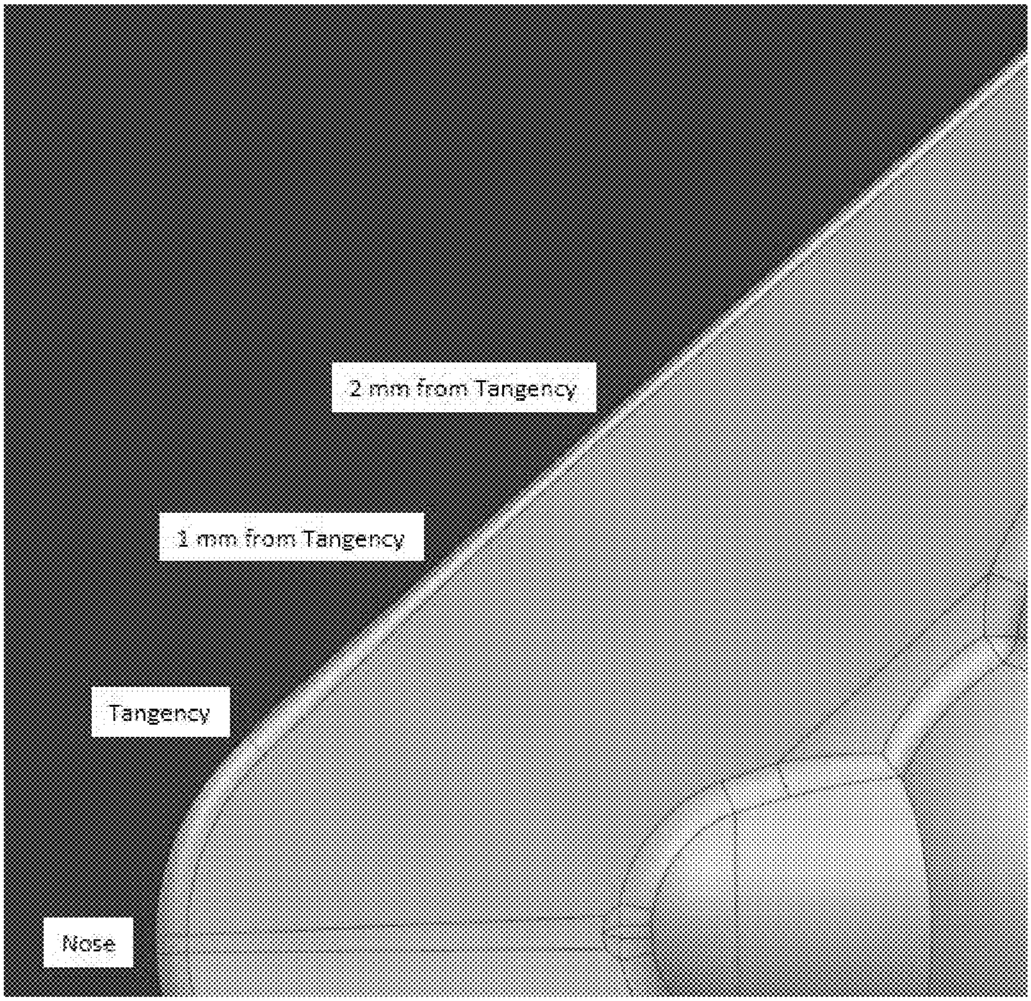
FIG. 6 shows a top view of a certain embodiment of a cutting insert of this invention.

Referring to FIG. 1 and FIG. 2, in certain other embodiments of this invention, a cutting insert (1) is provided comprising a base (3) and at least one cutting edge (5) positioned in juxtaposition to the base (3) and wherein the cutting edge (5) has a first end (11) and a second end (13) that is located opposite to the first end (11) and wherein the cutting edge (5) has a length (15) extending from the first end (11) to the second end (13) and wherein the cutting edge (5) has a first height (20) measured from a plane (17) of the base (3) and wherein the first height (20) of the cutting edge (5) varies over the length (15) of the cutting edge (5), and wherein the cutting edge (5) has a nose (7) located at the second end (13) of the cutting insert (1) and a depth of cut location (9) located opposite to the nose (7) and extending in part away from the nose (7) in the direction toward the first end (11) of the cutting insert (1), and wherein the cutting edge (5) of the cutting insert (1) at the depth of cut location (9) has a second height (21) and wherein the cutting edge (5) of the cutting insert (1) at the nose (7) has a third height (22), and wherein the second height (21) of the cutting edge (5) at the depth of cut location (9) is smaller in comparison to the third height (22) of the cutting edge (5) located at the nose (7) of the cutting edge (5). The present invention provides a cutting insert (1) that has a higher K-factor at the cutting edge (5) of the depth of cut location (9) compared to the K-factor at the cutting edge (5) of the nose (7) of the cutting insert (1). In a certain embodiment of this invention as shown in FIG. 1 and FIG. 6, the cutting edge (5) of the cutting insert (1) at the depth of cut location (9) has a second height (21) that is for example but not limited to being located 2 millimeters from a tangency said tangency located at reference number 22—third height, and wherein the second height (21) of the cutting edge (5) at the depth of cut location (9) is smaller in height in comparison to the first height (20) of said cutting edge (5) wherein said first height (20) is for example but not limited to being located 1 millimeter from said tangency of said cutting edge (5) wherein said tangency located at reference number 22 is in juxtaposition to said nose (7) of the cutting edge (5). As used herein, the term "juxtaposition" means placing two or more elements side by side or in a location near each other.

TABLE 1

| Location | Edge Radius | K-Factor (ratio of rake surface rounding to clearance surface rounding) |
|---|---|---|
| Nose | 25 | 1.2 |
| Tangency | 28 | 1.7 |
| 1 mm from Tangency | 24 | 1.8 |
| 2 mm from Tangency | 15 | 2.2 |

FIG. 6 shows a top view of a certain embodiment of a cutting insert of this invention.

Figure 7:
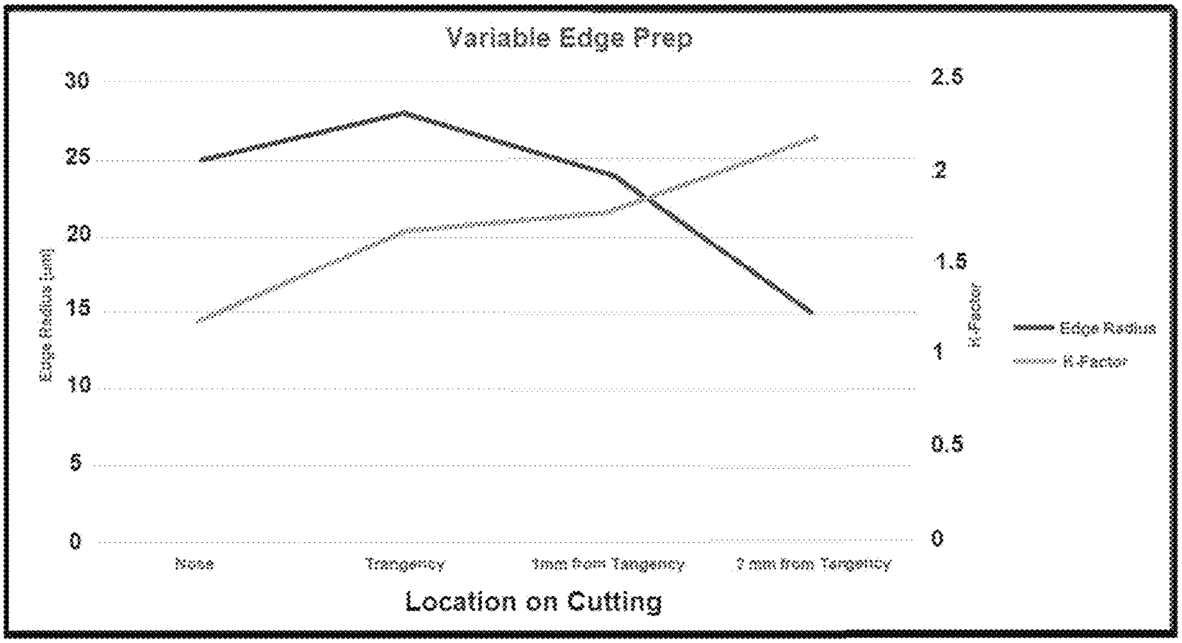
FIG. 7 shows a graph showing edge radius of the cutting insert of this invention and the K-factor at certain locations of the top view of FIG. 6.

FIG. 7 shows a graph showing edge radius of the cutting insert of this invention and the K-factor at certain locations of the top view of FIG. 6.

Figure 8A:
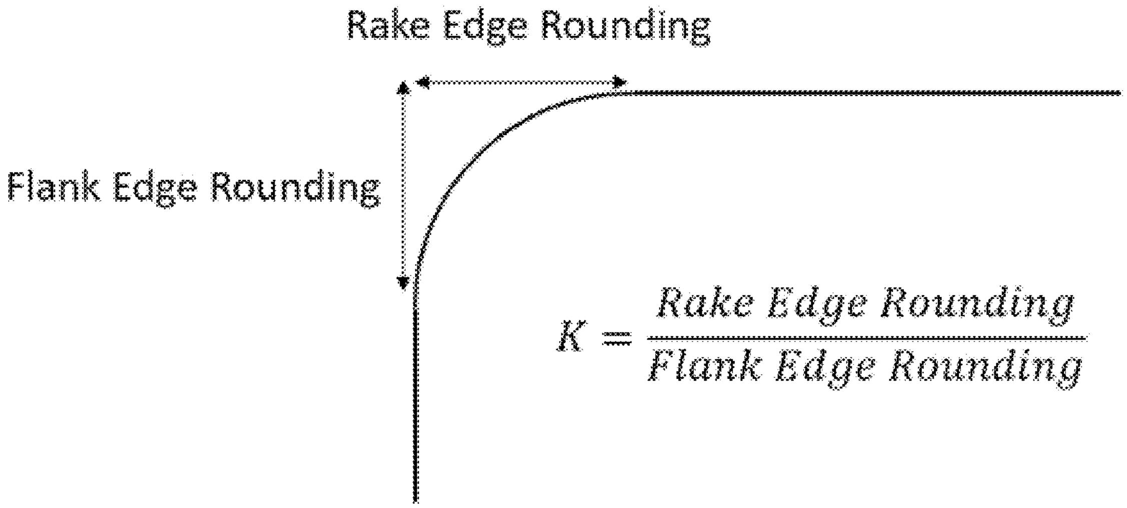
FIG. 8A shows a K-Factor equation.
Figure 8B:
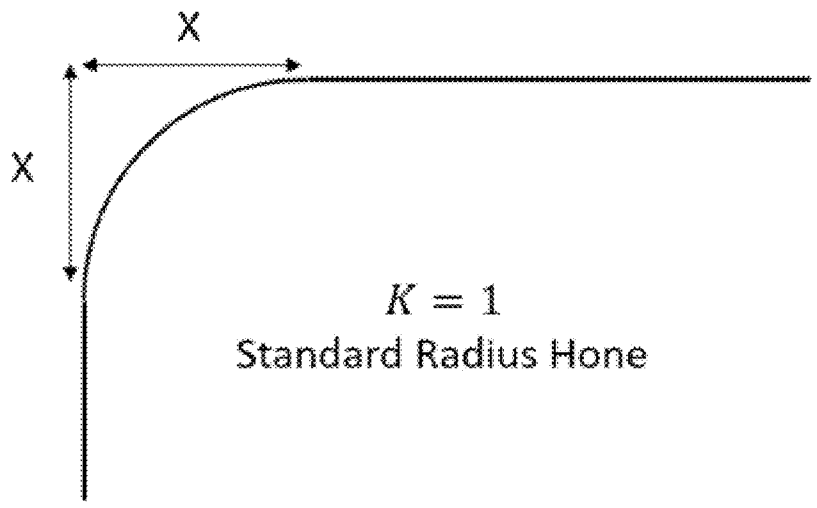
FIG. 8B shows a standard radius hone having a K-Factor of 1.
Figure 8C:
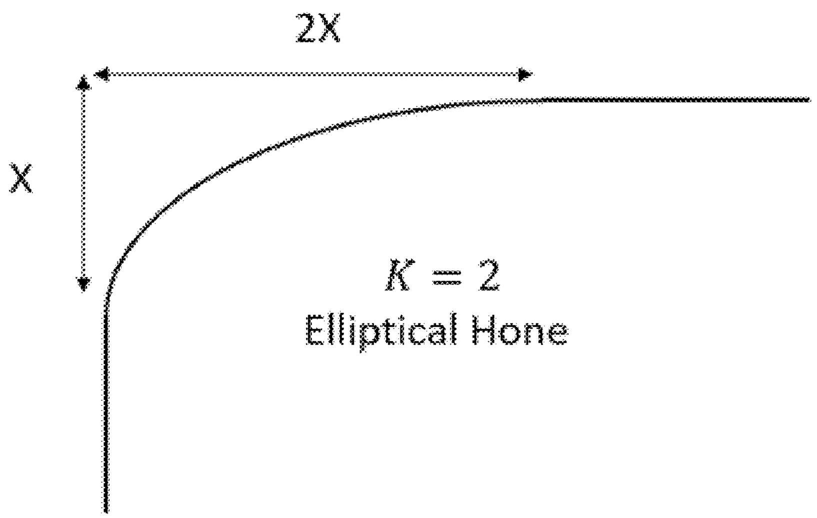
FIG. 8C shows an elliptical hone having a K-Factor of 2.

As used herein, the term "K-Factor" means the ratio of rake surface rounding to clearance surface rounding. In other words, "K-Factor" is the ratio between the rake edge rounding and the flank edge rounding, see FIG. 8A. By increasing the "K-Factor", the edge becomes stronger (see FIG. 8B and FIG. 8C), thus, increasing tool life in some applications. A higher K-Factor generally improves tool life on the cutting insert.

Cutting tool edge preparation is measured by size and shape. The rounding achieved on the rake and flank may be measured independently to fully define the hone shape. To describe the edge shape, K-Factor or "K" is commonly used.

Figure 3:
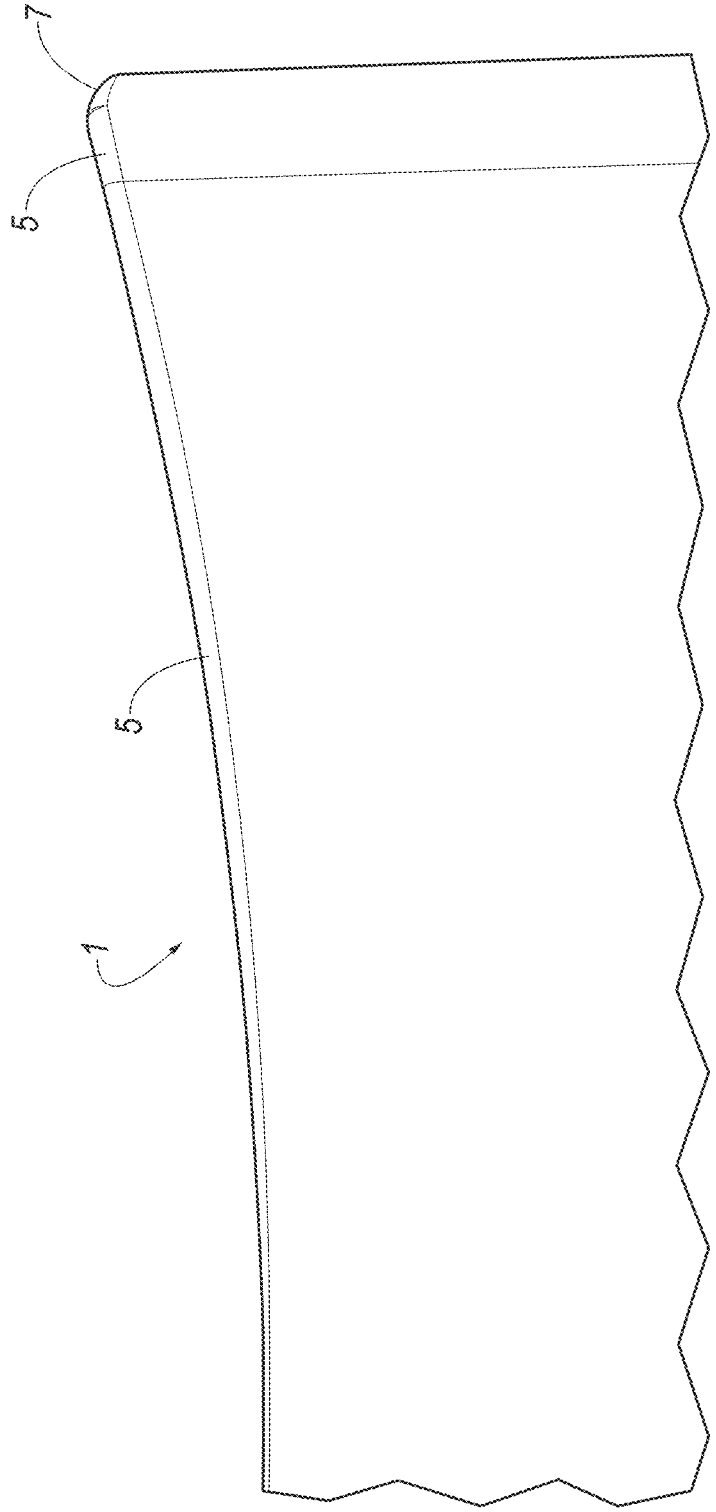
FIG. 3 shows a side view of another embodiment of a cutting insert of this invention having a variable functional cutting edge having a large radius of the cutting edge.
Figure 4:
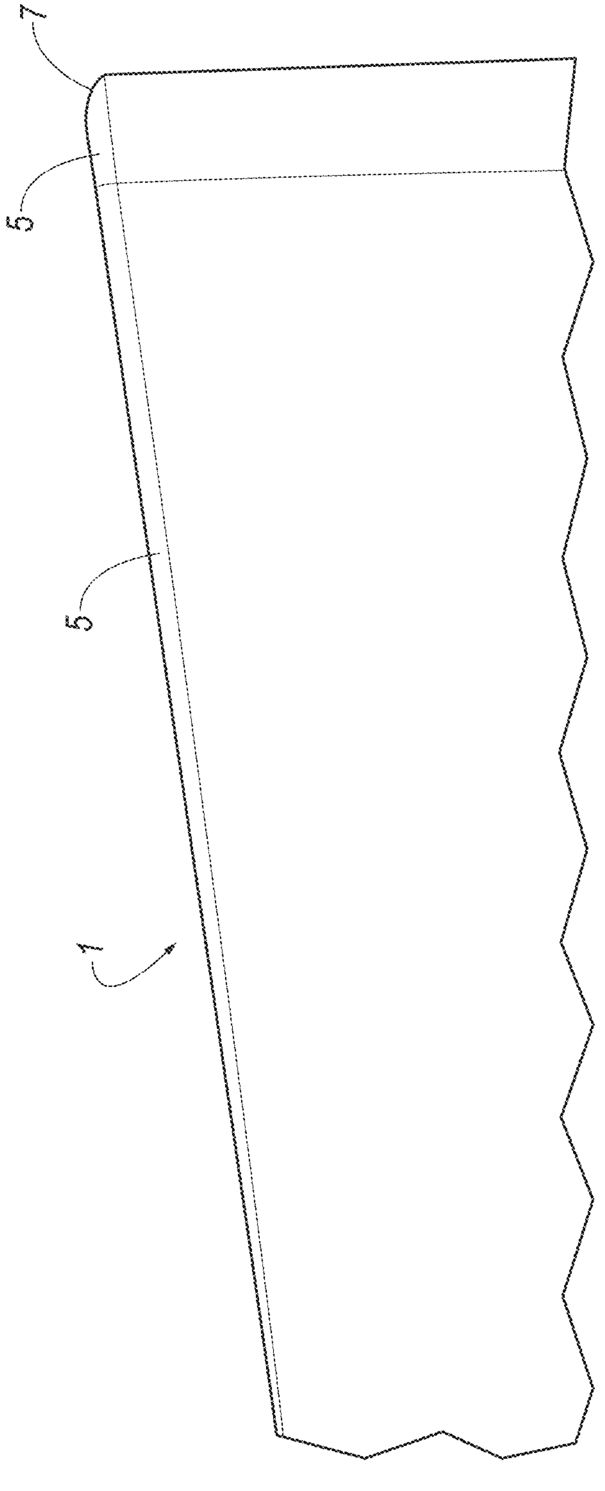
FIG. 4 shows a side view of another embodiment of a cutting insert of this invention having a variable functional cutting edge having a linear formation.
Figure 5:
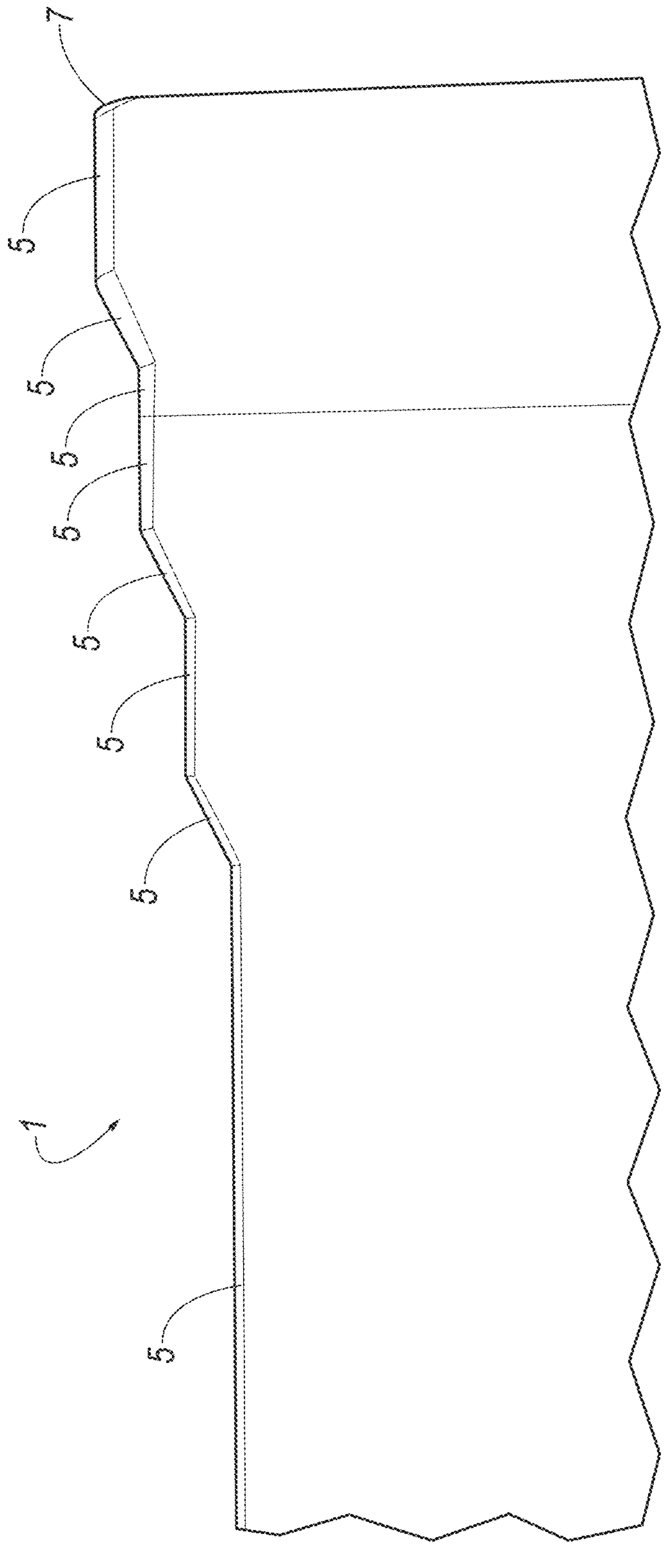
FIG. 5 shows a side view of another embodiment of a cutting insert of this invention having a variable functional cutting edge that is in a stepped formation.

The higher K-Factor at the depth of cut location will improve tool life, while allowing for a standard radius edge prep on the insert nose. The cutting insert of the present invention allows for standard honing brushes to be used in the manufacturing process of the variable functional edge of the present cutting insert without the need for special elliptical honing brushes or processing methods. Those persons of ordinary skill in the art will appreciate that the present invention's change of the cutting edge height of the cutting edge at the depth of cut location of the cutting insert compared to the height of the cutting edge of the nose of the cutting insert, combined with the use of a known in the art planar brush honing process creates an elliptical high K-factor hone in the depth of cut location (area) (see FIG. 8C). To achieve the higher K-factor, the height (i.e. second height) of the cutting insert at the depth of cut location is smaller in comparison to the height (i.e. third height) of the cutting edge at the nose of the cutting insert. FIGS. 1, 2, 3, 4, and 5 show a drop (i.e. change) in height (i.e. a second height) of the cutting insert at the depth of cut location relative to the height (i.e. a third height, or multiple different heights (see FIG. 5—multiple stepped heights) of the cutting edge at the nose of the cutting insert. FIG. 3 shows a side view of an embodiment of a cutting insert of this invention having a variable functional cutting edge having a large radius of the cutting edge. FIG. 4 shows a side view of an embodiment of a cutting insert of this invention having a variable functional cutting edge having a linear formation. FIG. 5 shows a side view of an embodiment of a cutting insert of this invention having a variable functional cutting edge that is in a stepped formation wherein a height of said cutting edge decreases along a length of said cutting edge insert spanning along said length from right to left of said cutting edge.

Those persons of ordinary skill in the art appreciate that in some turning operations, a depth of cut notch may be formed on the cutting insert that leads to failure of the cutting insert. Changing the edge-preparation of the cutting insert involves changing the edge hone size and shape on the entire cutting edge of the cutting insert. It is difficult to achieve a significant, controllable differentiation in edge condition between the nose of the cutting insert and the depth of cut location. The present invention overcomes these difficulties and provides a cutting insert having a variable functional cutting edge that has a higher K-factor in the area of the depth of cut location compared to the K-factor of the cutting edge of the nose of the cutting insert.

As used herein, “including,” “containing” and like terms are understood in the context of this application to be synonymous with “comprising” and are therefore open-ended and do not exclude the presence of additional undescribed or unrecited elements, materials, phases or method steps. As used herein, “consisting of” is understood in the context of this application to exclude the presence of any unspecified element, material, phase or method step. As used herein, “consisting essentially of” is understood in the context of this application to include the specified elements, materials, phases, or method steps, where applicable, and to also include any unspecified elements, materials, phases, or method steps that do not materially affect the basic or novel characteristics of the invention.

For purposes of the description above, it is to be understood that the invention may assume various alternative variations and step sequences except where expressly specified to the contrary. Moreover, all numbers expressing, for example, quantities of ingredients used in the specification and claims, are to be understood as being modified in all instances by the term “about”. Accordingly, unless indicated to the contrary, the numerical parameters set forth are approximations that may vary depending upon the desired properties to be obtained by the present invention. At the very least, and not as an attempt to limit the application of the doctrine of equivalents, each numerical parameter should at least be construed in light of the number of reported significant digits and by applying ordinary rounding techniques.

It should be understood that any numerical range recited herein is intended to include all sub-ranges subsumed therein. For example, a range of “1 to 10” is intended to include all sub-ranges between (and including) the recited minimum value of 1 and the recited maximum value of 10, that is, having a minimum value equal to or greater than 1 and a maximum value of equal to or less than 10.

In this application, the use of the singular includes the plural and plural encompasses singular, unless specifically stated otherwise. In addition, in this application, the use of “or” means “and/or” unless specifically stated otherwise, even though “and/or” may be explicitly used in certain instances. In this application, the articles “a,” “an,” and “the” include plural referents unless expressly and unequivocally limited to one referent.

Whereas particular embodiments of this invention have been described above for purposes of illustration, it will be evident to those skilled in the art that numerous variations of the details of the present invention may be made without departing from the invention as defined in the appended claims.

What is claimed is:

1. A cutting insert comprising:

a cutting edge having a nose and a depth of cut location, wherein said cutting edge has a first end and a second end that is located opposite to said first end, and wherein said nose is located at said second end of said cutting edge, said nose having a height and a first K-factor, and wherein a portion of said cutting edge at the depth of cut location is positioned opposite to said nose and extends away from said nose in the direction toward said first end of said cutting insert, said portion of said cutting edge at the depth of cut location having a height and a second K-factor, the height of said portion of said cutting edge at the depth of cut location being less than the height of the nose, wherein the first K-factor is a ratio of a rake surface rounding of the nose to clearance surface rounding of the nose; and wherein the second K-factor is a ratio of rake surface rounding at the depth of cut location to clearance surface rounding at the depth of cut location, the second K-factor being higher than the first K-factor; and wherein the nose is positioned at a higher location relative to the depth of cut location.

2. The cutting insert of claim 1, wherein a height of the cutting edge decreases along a length of said cutting edge that extends from the nose to the depth of cut location.

3. The cutting insert of claim 1, wherein the height at the depth of cut location is under a tangency of the cutting edge and the height of the nose is in juxtaposition of the tangency of the cutting edge.

4. The cutting insert of claim 1 wherein the cutting edge has a drop in height at a location between the nose and the portion of the cutting edge at the depth of cut location.

5. The cutting insert of claim 4 wherein said drop in height is stepped, linear, or on a radius of said cutting edge.

6. A cutting insert comprising:

a base and at least one cutting edge positioned in juxtaposition to said base and wherein said cutting edge has a first end and a second end that is located opposite to said first end and wherein said cutting edge has a length extending from said first end to said second end and wherein said cutting edge has a first height measured from a plane of said base and wherein said first height of said cutting edge varies over said length of said cutting edge, and wherein said cutting edge has a nose located at said second end of said cutting insert and a depth of cut location located opposite to said nose and a portion of said cutting edge at the depth of cut location extending away from said nose in the direction toward said first end of said cutting insert, and wherein said cutting edge of the cutting insert at said depth of cut location has a second height and wherein said cutting edge of said cutting insert at said nose has a third height, and wherein said second height of said cutting edge at said depth of cut location is smaller in comparison to said third height of said cutting edge located at said nose of said cutting insert; and wherein the nose is positioned at a higher location relative to the depth of cut location.

7. The cutting insert of claim 6 including wherein there is a drop in said first height between said second height and said third height.

8. The cutting insert of claim 7 wherein said drop in said first height between said second height and said third height is stepped, linear, or on a radius of said cutting edge.

9. The cutting insert of claim 7 having a higher K-factor at said cutting edge of said depth of cut location compared to the K-factor at said cutting edge of said nose of said cutting insert.

10. The cutting insert of claim 6, wherein the nose has a first K-factor and the depth of cut location has a second K-factor that is higher than the first K-factor.

11. The cutting insert of claim 10, wherein:

the first K-factor is a ratio of a rake surface rounding of the nose to clearance surface rounding of the nose; and the second K-factor is a ratio of rake surface rounding at the depth of cut location to clearance surface rounding at the depth of cut location, the second K-factor being higher than the first K-factor.

12. The cutting insert of claim 11, wherein the height at the depth of cut location is under a tangency of the cutting edge and the height of the nose is in juxtaposition of the tangency of the cutting edge.

* * * * *